United States Patent [19]

Sanekata et al.

[11] 3,915,751

[45] Oct. 28, 1975

[54] PROCESS FOR MANUFACTURING STORAGE BATTERIES AND BATTERY PRODUCED THEREBY

[75] Inventors: Nobuo Sanekata; Osamu Hamada, both of Takatsuki, Japan

[73] Assignee: Yuasa Battery Company Limited, Japan

[22] Filed: May 8, 1973

[21] Appl. No.: 358,339

[52] U.S. Cl. .......... 136/135 S; 136/135 R; 136/176
[51] Int. Cl.² ..................................... H01M 2/30
[58] Field of Search ........ 136/134 R, 135 R, 135 S, 136/176

[56] References Cited
UNITED STATES PATENTS

| | | | |
|---|---|---|---|
| 3,242,012 | 3/1966 | Sabatino | 136/134 R |
| 3,261,719 | 7/1966 | Shannon | 136/134 R |
| 3,396,056 | 8/1968 | Gonnard | 136/134 R |
| 3,746,579 | 7/1973 | Port | 136/134 R |
| 3,753,783 | 8/1973 | Eberle | 136/134 R |
| 3,767,889 | 10/1973 | Sano | 136/134 R |

*Primary Examiner*—Patrick P. Garvin
*Assistant Examiner*—John F. Niebling
*Attorney, Agent, or Firm*—Watson, Cole, Grindle & Watson

[57] ABSTRACT

This invention relates to a process for manufacturing storage batteries and the batteries produced by such process. The process comprises the steps of inserting anode and cathode plates into a container therefor; inverting the container and embedding the projecting lugs of the anode and cathode plates in a sealing agent disposed in concavities in a cover for the container; sealing the cover on the container; removing respective portions of the cover after the solidification of the sealing agent to thereby present a plurality of cavities, each of which expose the lugs of corresponding anode plates and cathode plates of adjacent cells to be interconnected; forming connectors for the lugs by filling each cavity with a molten conductive material and allowing the molten material to solidify; and coating the connectors with an insulator. The present invention presents a process which is easily adapted for mass production of inexpensive storage batteries which perform favorably.

7 Claims, 4 Drawing Figures

PROCESS FOR MANUFACTURING STORAGE BATTERIES AND BATTERY PRODUCED THEREBY

This invention relates to storage batteries and more particularly to a process for producing intercell connector type storage batteries.

Various procedures have been utilized in the past for producing conventional intercell connector type storage batteries. Among these procedures is one wherein anode plates, cathode plates and separators are pushed into a so-called monoblock container having a number of partition walls presenting a plurality of cells. The lugs of similar plates in one cell are then connected, through the use of a connector, with the lugs of different plates in adjacent cells. Thereafter, the container is inverted and the connectors are embedded in a sealing agent which fills grooves on the back of the cover. The container and cover are then sealed together with the sealing agent so that leakage between the cells is prevented.

In the foregoing procedure, the anode plates, cathode plates and separators must be pushed into the container in such a manner that they do not drop out when the container is inverted but remain in position to be connected by the connectors. Thus, the force which must be applied to appropriately arrange the anode plates, cathode plates and separators is so strong that the anode plates, cathode plates or separators are often damaged. Moreover, in accordance with such prior procedures, a burning jig is required to connect the plates with the connectors with the result that the plates and adjacent parts are often damaged by burning heat.

The defects of such prior art processes are eliminated through the use of the present invention.

A first object of the present invention is to provide a process for producing an intercell connector storage battery which performs favorably and which is inexpensive to produce.

A second object of the invention is to provide a storage battery which is easily produced and a process for making the same which is adapted to mass production.

The objects of the invention are accomplished by the provision of a process for manufacturing storage batteries which comprises inserting anode and cathode plates having lugs into a hollow container therefor in such a manner that the lugs project outwardly from the container. A cover for the container having means presenting at least one concavity adapted to open toward the container after assembly is provided and the process includes the step of positioning the cover with the concavity opening upwardly and then filling the concavity with a liquid, hardenable sealing agent. The container is positioned above the cover with the lugs projecting toward the liquid sealing agent in the concavity and then the cover and the container are moved into contact with one another whereby the lugs are thrust into and embedded in the liquid sealing agent. The cover is attached to the container and the sealing agent is allowed to solidify. Thereafter a portion of the cover and of the sealing agent are removed to present a cavity which exposes the embedded lugs. The process then includes the step of filling such cavity with a molten conductive material and allowing the molten material to solidify to present connectors for the lugs.

More particularly, the anode and cathode plates and the separators therefor are inserted into the container in such a manner that the same are positively forced against one another. Preferably the container and the cover are constructed of polypropylene and the attaching step preferably comprises heat-sealing the cover to the container.

The present invention and the objects thereof can be more fully understood by referring to the following description and the accompanying drawings in which.

Figure 1:
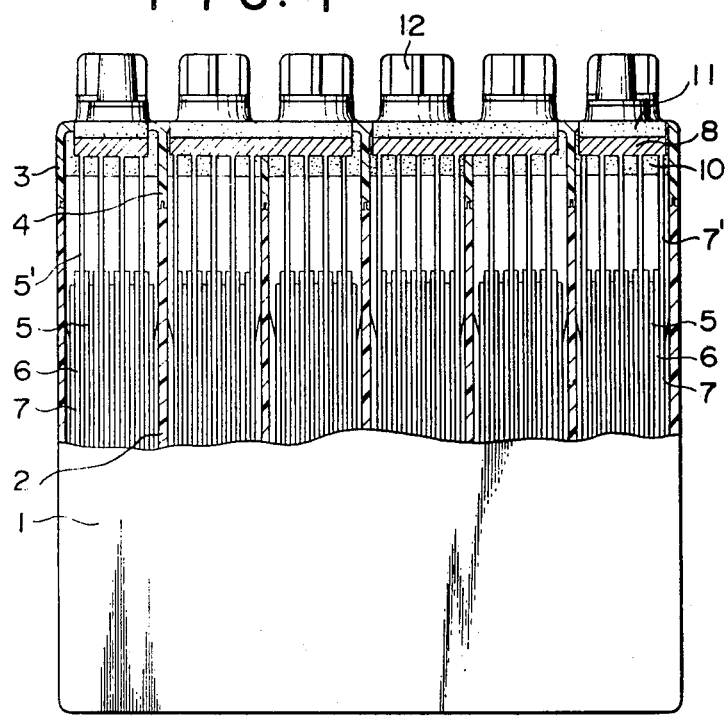
FIG. 1 is a partially cross-sectional, side elevational view of a storage battery constructed utilizing the process of the present invention.
Figure 2:
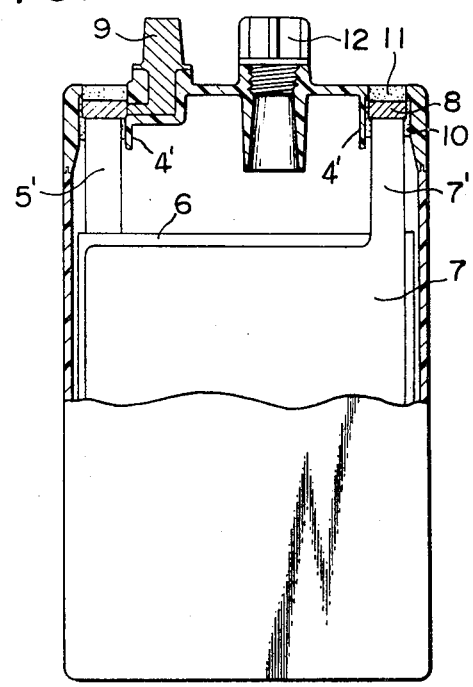
FIG. 2 is a partially cross-sectional, side elevational view of the battery of FIG. 1.

In FIGS. 1 and 2 of the drawings, the reference numeral 1 designates a battery container constructed of a synthetic resin such as polypropylene, an acrylonitrile-butadiene-styrene copolymer or an acrylonitrile-styrene copolymer. The container is preferably a monoblock container having a plurality of partition walls 2 presenting the required number of cells. The reference numeral 3 designates a cover constructed of the same material as container 1 and cover 3 has partition walls 4 which correspond with partition walls 2. Cover 3 is also provided with a pair of partition walls 4' (See FIG. 3) which cross partition walls 4. These walls in cover 3 present a series of concavities 18 which are illustrated particularly in FIG. 3 where it can be seen that concavities 18 open toward the interior of container 1.

The required number of battery elements, each consisting of a cathode plate 5, a separator 6 and an anode plate 7 arranged in the order mentioned, are pushed into each of the cells presented by container 1. A connector 8 constructed of a conductive material such as lead or a lead alloy connects the lugs of the similar plates in one cell with the lugs of the different plates in the adjacent cell.

The lugs of the cathode plates 5' of one end cell are connected with the terminal 9 through a connector 8 while the lugs of the anode plates 7' of the other end cell are connected with the terminal 9' through another connector 8. (See particularly FIG. 4). A sealing agent for the plates is designated by the reference numeral 10 while the reference numeral 11 designates a filler. It is desirable that the sealing agent and the filler each consists of a thermosetting synthetic resin such as, for example, an epoxy resin. An electrolyte port plug is designated by the reference numeral 12.

The process for producing storage batteries in accordance with the present invention is explained in detail in the following.

Figure 3:
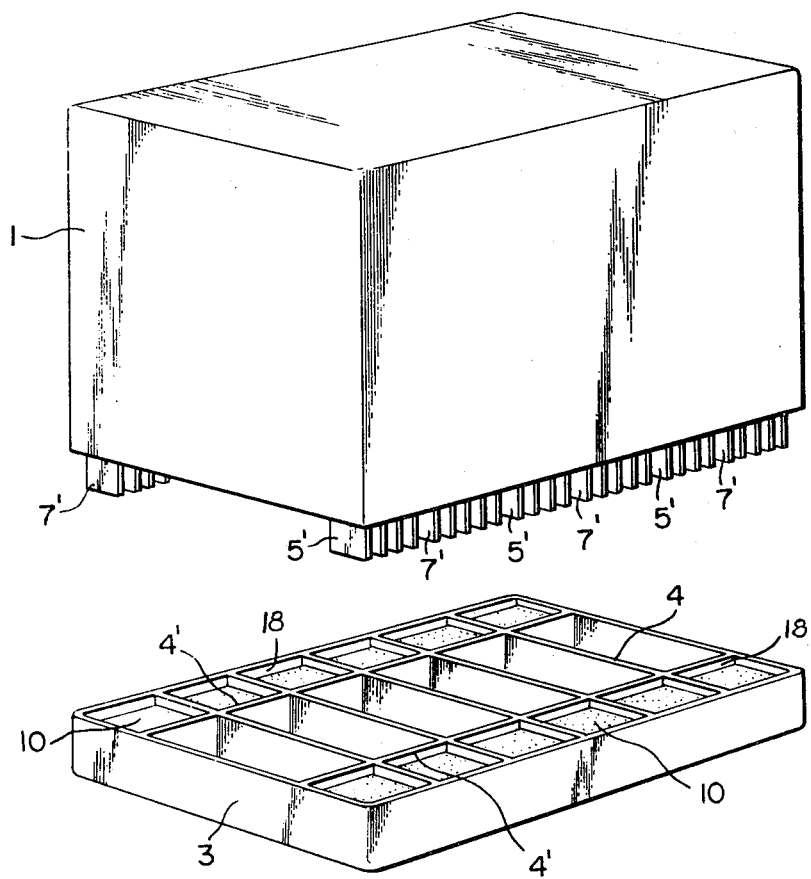
FIG. 3 is a perspective view illustrating one step of the process of the present invention.

As illustrated in FIG. 3, the required number of battery elements, each consisting of a cathode plate 5, a separator 6 (invisible) and an anode plate 7 arranged in the order mentioned, are pushed into each cell of container 1 in a manner such that the same are forced against each other. It is to be noted in this regard, that one of the most important features of the present invention is the omission of the conventional steps of accurately arranging the positions of the respective lugs of the anode and cathode plates thus pushed into the container and the connection of the lugs using a burning jig. Thus, in accordance with the present invention, the clearances between the respective lugs of the anode and cathode plates does not need to be uniform and the lugs may be deformed and may be positioned at different heights whereby the storage battery of the present invention is very simple to construct. Moreover, in accordance with the present invention, it is not necessary to push the anode and cathode plates and the separators into the battery container so forcefully that the lugs are damaged and the performance of the storage battery is impaired.

The concavities 18 of cover 3 which are formed by partition walls 4 and 4' are filled with a sealing agent 10 as can be seen viewing FIG. 3. Lugs 5' and 7' of cathode plates 5 and anode plates 7 which project from container 1 are then pushed into and embedded in the sealing agent 10 in concavities 18. For this purpose, the lugs of the anode and cathode plates are adjusted in advance so that the same project outwardly of the upper edge of the battery container. Battery container 1 and cover 3 are then joined and sealed together through the use of an appropriate sealing agent. For this purpose, it is desirable to form a groove in the edge of cover 3 and to fit a tongue of the edge of battery container 1 into the groove, all as illustrated in FIGS. 1 and 2. Then, cover 3 and container 1 may be joined through the use of a sealing agent so that the same are completely sealed together. It should also be noted that if container 1 and cover 3 are made of polypropylene or the like, the same may be heat-sealed.

Figure 4:
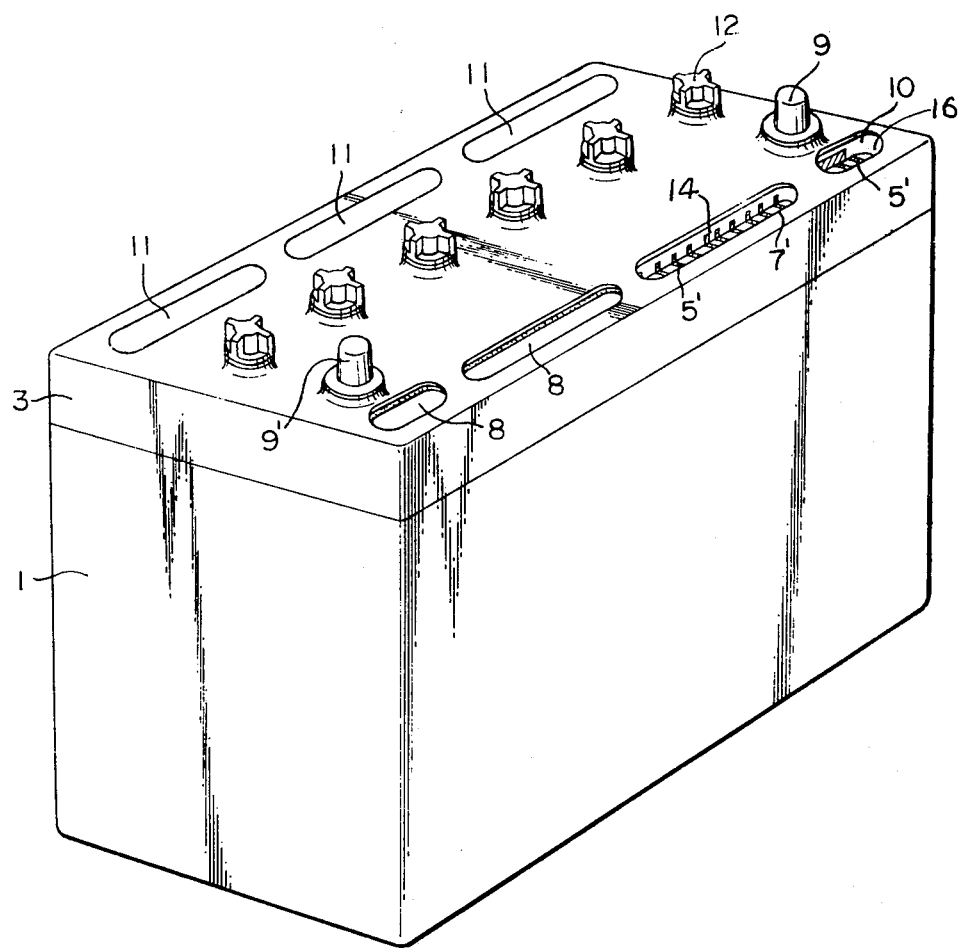
FIG. 4 is a perspective view illustrating respective steps which follow the step of FIG. 3.

After the solidification of the sealing agent 10 disposed in cavities 18 and in which lugs 5' and 7' of cathode plates 5 and anode plates 7 are embedded, the storage battery may be turned upright. Then, respective portions of cover 3 are removed with an end mill or the like. During this operation, corresponding portions of the sealing agent 10 are also removed. Thus, cavities 14 which expose respective lugs 5' and 7' of cathode plates 5 and anode plates 7 are presented. In the end cells, a portion of terminal 9 or 9', as the case may be, which has been molded in the cover in advance, will also be exposed by cavities 16. Terminals 9 and 9' are illustrated in FIG. 4.

During the foregoing material removal operations, if the upper ends of the lugs 5' and 7' are cut slightly to remove the film of oxidized metal which is often disposed thereon, the fusion between the connector and the lugs will be improved such that electrical resistance is reduced and a storage battery having comparatively favorable performance characteristics is obtained.

After the material removal steps referred to above, the respective cavities 14 and 16 are filled with a molten conductive material, such as lead or a lead alloy, up to a level lower than the upper surface of cover 3. Thus, exposed lugs 5' and 7' and/or the exposed portions of terminals 9 and 9' are contacted directly by the molten metal in the cavities 14 and 16. The molten metal is then permitted to solidify whereby to present connectors 8 which are illustrated in FIG. 4. The upper surfaces of connectors 8 are filled with fillers 11 which are also shown in FIG. 4. It is to be noted that insulative covering plates may be used instead of fillers 11.

The present invention provides the following advantages:

1. There is no necessity for accurately positioning the respective lugs of the plates to facilitate the use of a burning jig but rather, the clearances between the lugs may be non-uniform and the lugs may be deformed or disposed at different heights. As a result, the assembly of the battery is very simple.

2. There is no necessity for forcing the anode plates, the cathode plates and the separators into the battery container for the purpose of accurately arranging the positions of the respective lugs of the plates. Thus, lug damage and the resultant impairment of battery performance is minimized.

3. Since the respective lugs of the anode and cathode plates and a part of each terminal are directly exposed to and are connected through an initially molten mass of a conductive material such as a lead or a lead alloy, there is no danger that the anode and cathode plates will be damaged by direct exposure to heat.

4. Since the plates are directly connected to the plates of adjacent cells and to the terminals, there is no necessity for providing component parts such as straps and poles. Accordingly, the assembly of the storage battery is simplified and the storage battery thus produced is inexpensive.

The present invention is not to be limited to the embodiment described above and it will be readily apparent that various modifications are possible without deviating from the spirit of the present invention. For example, the respective lugs of the anode and cathode plates and a part of each terminal could be exposed by removing a portion of the side of the cover rather than a portion of the upper surface thereof.

What is claimed is:

1. A process for manufacturing a storage battery comprising the steps of:
   inserting anode and cathode plates having lugs into a hollow container therefor in such a manner that said lugs project outwardly from the container;
   providing a cover for said container, said cover having means presenting at least one concavity adapted to open toward the interior of the container after assembly;
   positioning said cover with said concavity opening upwardly and filling the concavity with an initially liquid, hardenable, non-metallic sealing agent;
   positioning the container above the cover with said lugs projecting toward the liquid sealing agent in the concavity and moving the cover and the container into contact with one another whereby the lugs are thrust into and embedded in the liquid sealing agent;
   attaching the cover to the container and allowing the sealing agent to solidify;
   thereafter removing a portion of the cover and of the sealing agent to thereby present a cavity which exposes the embedded lugs; and then
   filling said cavity with a molten conductive material and allowing said molten material to solidify to present connectors for said lugs.

2. A process as set forth in claim 1 wherein said anode and cathode plates and separators therefor are inserted into said container in such a manner that the same are positively forced against one another.

3. A process as set forth in claim 1 wherein said container and said cover are constructed of polypropylene.

4. A process as set forth in claim 3 wherein said attaching step comprises heat-sealing said cover to said container.

5. A process as set forth in claim 1 wherein said removing step comprises milling said cover with an end mill.

6. A process as set forth in claim 1 wherein said sealing agent comprises an epoxy resin.

7. A storage battery produced by the process set forth in claim 1.

* * * * *